US012717905B2

(12) United States Patent
Patankar et al.

(10) Patent No.: US 12,717,905 B2
(45) Date of Patent: Aug. 25, 2026

(54) MACHINE LEARNING ASSISTED ROOT CAUSE ANALYSIS FOR COMPUTER NETWORKS

(71) Applicant: Juniper Networks, Inc., Sunnyvale, CA (US)

(72) Inventors: Ajit Krishna Patankar, Fremont, CA (US); Kihwan Han, Pleasanton, CA (US); Prasad Miriyala, San Jose, CA (US); Mansi Joshi, San Jose, CA (US); Shruti Jadon, San Jose, CA (US); Deepak Kumar Naik, Bangalore (IN); Maria Charles Maria Selvam, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 244 days.

(21) Appl. No.: 18/459,036

(22) Filed: Aug. 30, 2023

(65) Prior Publication Data

US 2024/0176878 A1 May 30, 2024

(30) Foreign Application Priority Data

Nov. 28, 2022 (IN) ............................ 202241068448

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,397,810 | B2 * | 8/2019 | Yang | H04W 24/04 |
| 10,516,761 | B1 | 12/2019 | A et al. | |
| 12,242,332 | B2 * | 3/2025 | Ashrafi | G06F 11/079 |
| 2017/0031742 | A1 * | 2/2017 | Jilani | G06F 11/079 |
| 2018/0241693 | A1 * | 8/2018 | Patil | H04L 47/827 |

(Continued)

FOREIGN PATENT DOCUMENTS

| | | | | |
|---|---|---|---|---|
| CN | 114265757 A | | 4/2022 | |
| EP | 3752921 B1 | * | 10/2021 | G06F 11/3404 |

OTHER PUBLICATIONS

Guy, Nathaniel. Techniques for Fault Detection and Visualization of Telemetry Dependence Relationships for Root Cause Fault Analysis in Complex Systems. Diss. 2016. (Year: 2016).*

(Continued)

*Primary Examiner* — Paul R Fisher

(74) *Attorney, Agent, or Firm* — Shumaker & Sieffert P.A.

(57) ABSTRACT

An example system for performing root cause analysis for a plurality of network devices includes one or more processors implemented in circuitry and configured to: receive telemetry data from the plurality of network devices; apply an artificial intelligence (AI) anomaly detection model, trained on historical telemetry data to detect anomalies in the historical telemetry data, to the received telemetry data to detect one or more anomalies in the received telemetry data; and apply an AI root cause analysis mode, trained on historical data, to the anomalies to determine a root cause of an issue causing the one or more anomalies.

20 Claims, 4 Drawing Sheets

(56) References Cited

U.S. PATENT DOCUMENTS

| | | | | |
|---|---|---|---|---|
| 2019/0236456 | A1* | 8/2019 | Kim | G06N 5/02 |
| 2019/0363971 | A1* | 11/2019 | Mermoud | H04L 41/0803 |
| 2020/0084087 | A1* | 3/2020 | Sharma | H04W 24/08 |
| 2020/0259700 | A1* | 8/2020 | Bhalla | G06F 3/0482 |
| 2020/0358683 | A1* | 11/2020 | Huang | H04L 41/0681 |
| 2021/0124510 | A1* | 4/2021 | Ferreira | G06F 3/0653 |
| 2022/0156123 | A1* | 5/2022 | Parker | G06F 9/5077 |

OTHER PUBLICATIONS

Extended Search Report from counterpart European Application No. 23212390.1 dated Mar. 19, 2024, 36 pp.

Bjorklund et al., "YANG—A Data Modeling Language for the Network Configuration Protocol (NETCONF)", Network Working Group, Oct. 2010, 173 pp., Retrieved from the Internet on Nov. 28, 2023 from URL: https://datatracker.ietf.org/doc/html/rfc6020.

Enns et al., "NETCONF Configuration Protocol", Network Working Group, Dec. 2006, 95 pp., Retrieved from the Internet on Nov. 28, 2023 from URL: URL: https://datatracker.ietf.org/doc/html/rfc4741.

Han, "Conditional Granger Causality for Root Cause Analysis in Networking", Medium, Jul. 21, 2022, 14 pp., URL: https://medium.com/@juniper.cto.aiml.2021/conditional-granger-causality-for-root-cause-analysis-in-networking-94e4bbc53347.

Harrington et al., "An Architecture for Describing Simple Network Management Protocol (SNMP) Management Frameworks", Network Working Group, Dec. 2002, 64 pp., Retrieved from the Internet on Nov. 28, 2023 from URL: https://datatracker.ietf.org/doc/html/rfc3411.

Okram et al., "Gremlin", Github, Jul. 11, 2016, 4 pp., Retrieved from the Internet on Nov. 28, 2023 from URL: https://github.com/tinkerpop/gremlin/wiki.

Yin et al., "TinkerPop Documentation", Apache TinkerPop, 298 pp., Retrieved from the Internet on Dec. 11, 2023 from URL: https://tinkerpop.apache.org/docs/current/reference/.

Response to Extended Search Report dated Mar. 19, 2024, from counterpart European Application No. 23212390.1 filed Nov. 26, 2024, 16 pp.

* cited by examiner

MACHINE LEARNING ASSISTED ROOT CAUSE ANALYSIS FOR COMPUTER NETWORKS

This application claims priority to India Provisional Application No. 202241068448, filed Nov. 28, 2022, the entire contents of which is hereby incorporated by reference.

TECHNICAL FIELD

This disclosure relates to computer networks, and more particularly, to analysis of telemetry data received from network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

To simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for performing root cause analysis to detect issues for managed network devices. A network management system (NMS) device, also referred to herein as a controller device, may configure the network devices to send telemetry data to an analysis device. The analysis device may apply a multivariate artificial intelligence (AI) model to the telemetry data to detect anomalies in the telemetry data. After detecting one or more anomalies, the analysis device may perform a root cause analysis on the anomalies to determine a root cause of an issue causing the one or more anomalies.

In one example, a method of performing root cause analysis for a plurality of network devices includes receiving telemetry data from the plurality of network devices; applying an artificial intelligence (AI) model, trained on historical telemetry data to detect anomalies in the historical telemetry data, to the received telemetry data to detect one or more anomalies in the received telemetry data; and performing root cause analysis on the anomalies to determine a root cause of an issue causing the one or more anomalies.

In another example, a system for performing root cause analysis for a plurality of network devices includes one or more processors implemented in circuitry and configured to: receive telemetry data from the plurality of network devices; apply an artificial intelligence (AI) model, trained on historical telemetry data to detect anomalies in the historical telemetry data, to the received telemetry data to detect one or more anomalies in the received telemetry data; and perform root cause analysis on the anomalies to determine a root cause of an issue causing the one or more anomalies.

In another example, a computer-readable storage medium has stored thereon instructions that, when executed, cause a processor to: receive telemetry data from the plurality of network devices; apply an artificial intelligence (AI) model, trained on historical telemetry data to detect anomalies in the historical telemetry data, to the received telemetry data to detect one or more anomalies in the received telemetry data; and perform root cause analysis on the anomalies to determine a root cause of an issue causing the one or more anomalies.

The details of one or more examples are set forth in the accompanying drawings and the description below. Other features, objects, and advantages will be apparent from the description and drawings, and from the claims.

DETAILED DESCRIPTION

Figure 1:
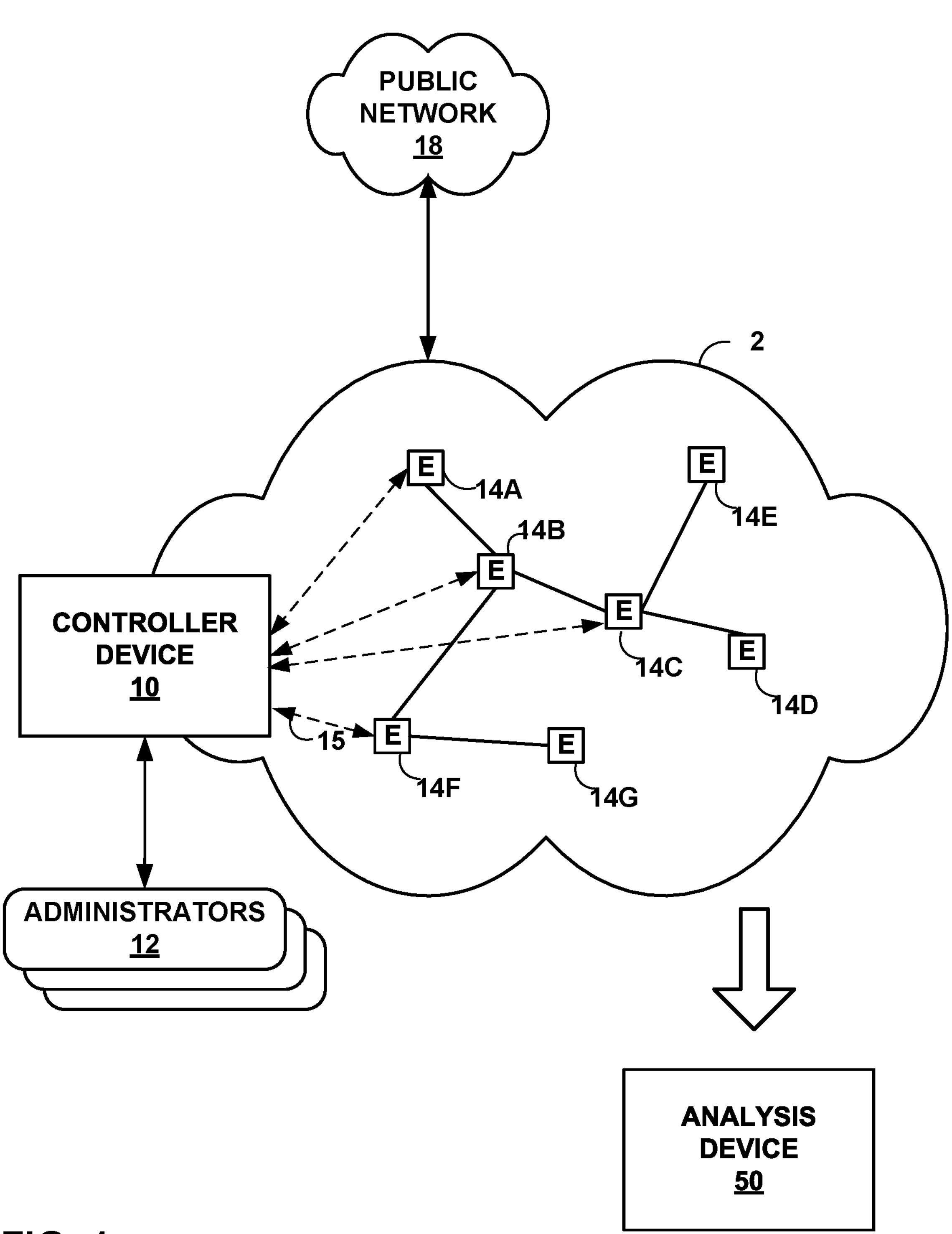
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. As another example, Network Configuration Protocol (NETCONF) provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed network elements 14, such as the SNMP protocol, NETCONF protocol, or a derivative thereof, such as the Juniper Device Management Interface, to perform the configuration. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data model changes, e.g., device configuration additions and removals. That is, y1=f1(x), y2=f2(x), . . . yN=fN(x).

Controller device 10 may use YANG modeling for intent data model and low-level device configuration models. This data may contain relations across YANG entities, such as list items and containers. As discussed in greater detail below, controller device 10 may convert a YANG data model into a graph data model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers, like controller device 10, use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources. Customer environments may be configured to allow customers (e.g., administrators 12) to control intent realization and assure programmed intents.

FIG. 1 further depicts analysis device 50. Controller device 10 may configure elements 14 to direct telemetry data to analysis device 50. The telemetry data may correspond to values for one or more key performance indicators (KPIs) and/or for one or more application programming interfaces (APIs). Over time, analysis device 50 may receive telemetry data for various multivariate timeseries. Analysis device 50 may then train a multivariate artificial intelligence (AI) model to detect anomalies from the telemetry data. After training the multivariate AI model, analysis device 50 may apply the multivariate AI model to newly received telemetry data to detect one or more anomalies among elements 14. Analysis device 50 may further perform a multivariate conditional Granger causality root cause analysis process to determine a root cause of one or more issues related to the one or more anomalies.

Figure 2:
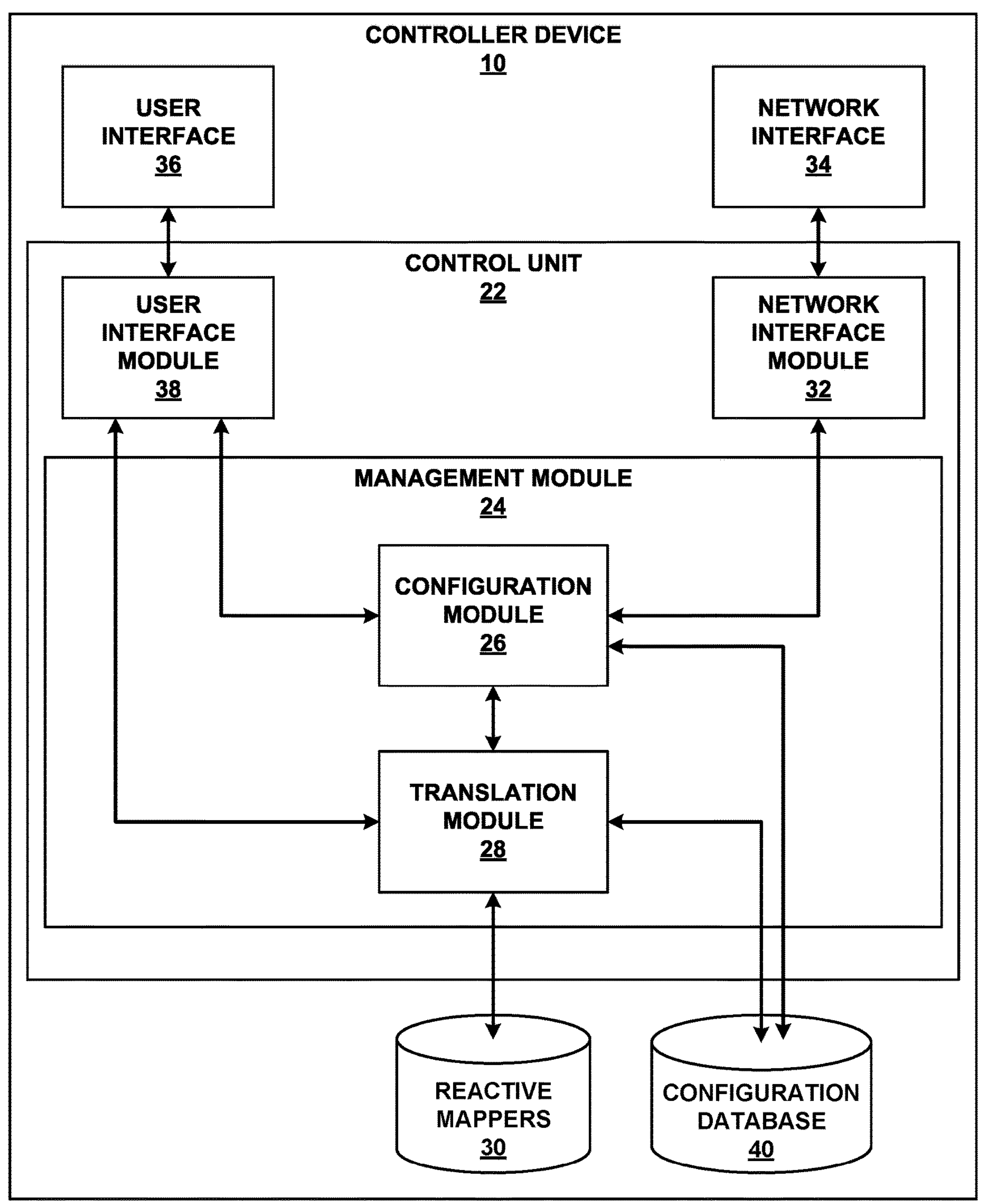
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 generally includes information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14).

Translation module 28 determines which of reactive mappers 30 to execute on the intent data model based on the information of configuration database 40, e.g., which of the devices are to receive the low-level configuration instructions. Translation module 28 then executes each of the determined reactive mappers of reactive mappers 30, providing the intent data model to the reactive mappers as input and receiving low-level configuration instructions. Translation module 28 may also be referred to as an intent compiler, which is a service containing a set of mappers, such as reactive mappers 30.

Configuration module 26 may first determine an existing intent data model for each service performed by the devices for which configuration is to be updated, e.g., by retrieving the intent data model for each of the services from configuration database 40. Configuration module 26 may then compare the existing intent data model (also referred to herein as a deployed graph model) to the newly received intent data model, and determine differences between the existing and newly received intent data models (also referred to as an undeployed graph model). Configuration module 26 may then add these changes to the compiler stream, and reactive mappers 30 may then translate these changes to low-level configuration information. The changes may be included in a change set, which may be a list containing intent graph vertices and corresponding version identifiers. Management module 24 may use the change set to track the list of vertices changed in an intent update. After the intent has been committed, management module 24 may use the change set to update vertex states in the intent graph model. Configuration module 26 also updates the existing intent data model recorded in configuration database 40 based on the newly received intent data model.

In some examples, reactive mappers 30 that perform update translations (that is, translating changes in the unified intent data model that results in updates to values of low-level configuration information, without creation or deletion of elements in the low-level configuration data) may operate as follows. In one example, the reactive mappers 30 that perform updates may override single elements. That is, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent data model vertices. Because each vertex has its own corresponding reactive mapper, compilation can be performed in parallel. That is, the reactive mappers of each of the vertices of the graph model representing the unified intent data model can be executed in parallel, thereby achieving parallel compilation. Translation module 28 may be configured to allow processing of only impacted intent data model data changes (i.e., those elements in the intent data model that are impacted by the changes). Based on reactive mappers 30, translation module 28 may infer dependencies across vertices in the intent data model. When the intent data model is changed, translation module 28 may publish messages in the compiler stream based on a dependency graph, as discussed above.

When a "create" template is uploaded (that is, a reactive mapper of reactive mappers 30 that processes new data in intent data model configuration information, relative to existing intent data model configuration information), translation module 28 may determine the dependencies using the dependency graph. When the service is changed, translation module 28 may generate a difference between the existing intent data model configuration information and the new intent data model configuration information, based on the dependencies. Translation module 28 may then use the reactive mapper of reactive mappers 30 to process the difference, and thereby translate the intent data model configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph data structure (or graph database) representing YANG configuration data elements. YANG specifies various types of data structures, including lists, leaflists, containers, containers with presence, and features. Management module 24 may model each of lists, containers, containers with presence, and features, as well as a top-level container, as vertices in a graph data structure. Alternatively, configuration database 40 may represent YAML configuration data elements.

After constructing the graph data structure, management module 24 may perform operations on data of the graph data structure. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph data structure if the condition attributes are changed. In response to the conditions, management module 24 may process additional changes, handled as functions as discussed in greater detail below. Management module 24 may further update all changes in transaction semantics.

Figure 3:
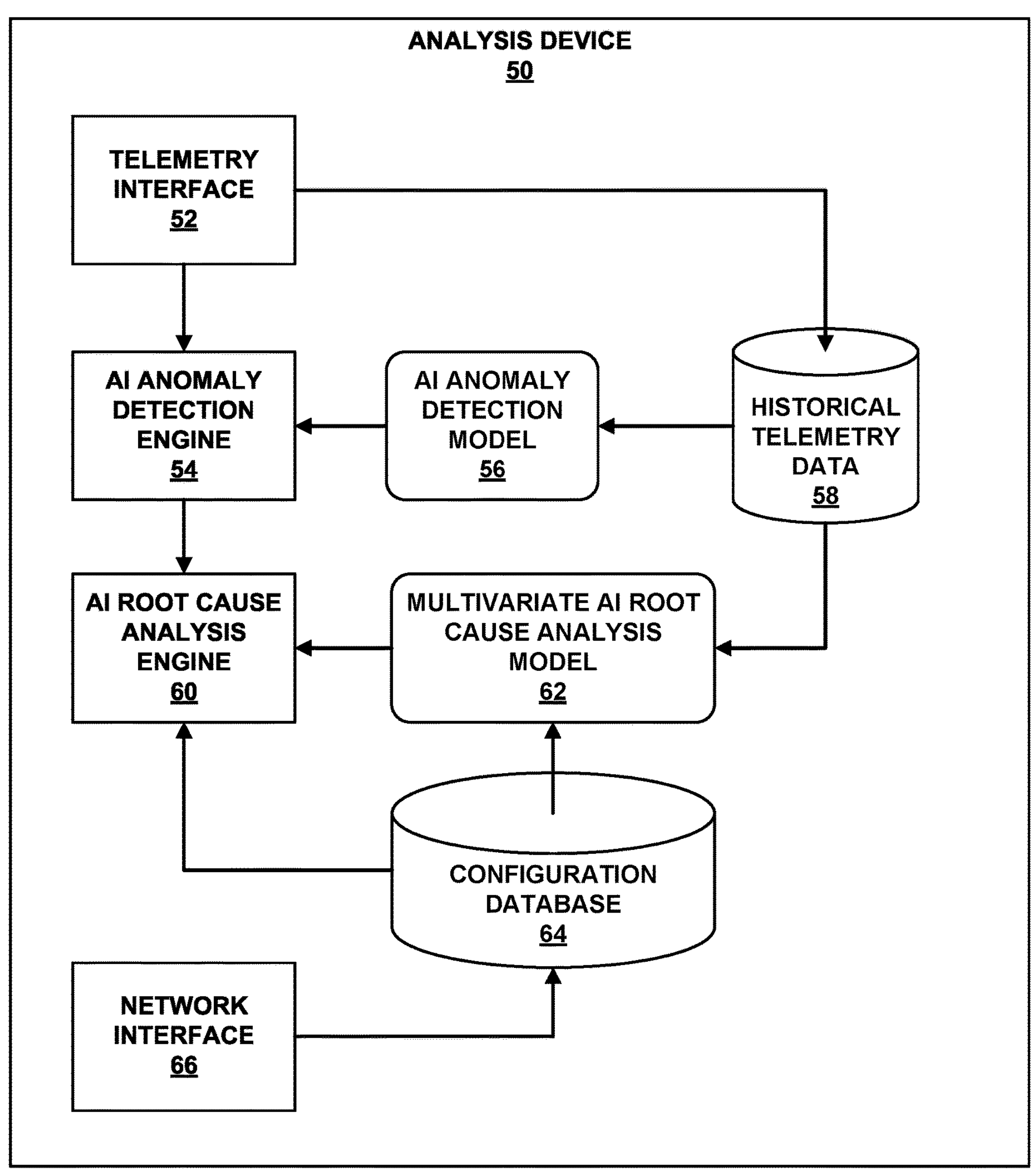
FIG. 3 is a block diagram illustrating an example analysis device according to the techniques of this disclosure.

FIG. 3 is a block diagram illustrating an example analysis device 50 that may be configured to perform the techniques of this disclosure. Analysis device 50 includes telemetry interface 52, artificial intelligence (AI) anomaly detection engine 54, AI anomaly detection model 56, historical telemetry data 58, root cause analysis engine 60, multivariate AI root cause analysis model 62, configuration database 64, and network interface 66.

Telemetry interface 52 is configured to receive telemetry data from elements 14 (FIG. 1). Telemetry data may be received for one or more APIs and/or for one or more KPIs. The telemetry data may be transformed into features to better represent the data for anomaly detection and root cause analysis AI models, by mathematical transforms. In response to receiving telemetry data, telemetry interface 52 may store the telemetry data to historical telemetry data 58 and provide real-time telemetry data to AI engine 54.

AI anomaly detection engine 54 may use AI model 56 to detect anomalies in the real-time telemetry data. The real-time telemetry data may be for a particular timeseries, e.g., a period of several milliseconds, seconds, minutes, hours, or the like.

AI anomaly detection model 56 may be trained using historical telemetry data 58 to identify anomalies in historical telemetry data 58. In particular, AI anomaly detection model 56 may be a multivariate AI model, which may be trained to identify which APIs and/or KPIs are most important for evaluation within a given timeseries in order to identify anomalies representing issues in the network including elements 14. In some examples, AI model 56 may be retrained over time using newly received telemetry data to improve the ability to detect anomalies from real-time telemetry data.

In response to detecting an anomaly, AI anomaly detection engine 54 may provide data representing the anomaly to AI root cause analysis engine 60. AI root cause analysis engine 60 may use the data representing the anomaly to determine a root cause of an issue corresponding to the anomaly. For example, the anomaly may correspond to a dropped packet. The packet may have been dropped due to a virtual private network (VPN) for a communication session may have gone down. The VPN may have gone down due to a link failure, which may have been caused due to a port of a network device having failed. Thus, while the anomaly may have been a dropped packet, the root cause of the dropped packet may have been a failure of a port on a network device. In particular, AI root cause analysis engine 60 may use configuration database 64 to determine how the network including elements 14 is configured. Configuration database 64 may include data similar to configuration database 40 of FIG. 2, in that configuration database 64 may represent how elements 14 are interconnected, how various components of elements 14 are configured (e.g., to host services and/or resources), or the like. Analysis device 50 may receive configuration data from controller device 10 via network interface 66 and store the received configuration data to configuration database 64.

Analysis device 50 may receive data representing tenancy information, configuration information, network topology, telemetry data, alerts, alarms, and select logs as inputs. From these inputs, analysis device 50 may generate data representing anomalies in the telemetry data, a prioritized list of nodes/KPIs as root causes, and a playbook for execution. An administrator may label new anomalies and validate model anomalies for AI anomaly detection model 56. In some examples, analysis device 50 may include multiple AI anomaly detection models, where each AI anomaly detection model may correspond to a particular KPI or set of KPIs.

Analysis device 50 may receive various types of data, such as metric data and non-metric data. Metric data may include counters, gauges, and histograms from various sources, e.g., as telemetry data via telemetry interface 52. Non-metric data may include the configuration and topology information received via network interface 66. Counters may include packets, drops, non-uniform memory access (NUMA) hits, and context switches. Counters may increase until a process or host restarts. Gauges may include values between a high and low of a certain metric type. Gauge values may be standard integer or rational number values or percentage values. Histograms may include a set of counters that generally represent one type of information. For example, all drop reasons combined with respective values of each reason may represent the normalcy or abnormality of drop patterns. Histograms may provide a visualization of data for troubleshooting. The network topology information may include metadata from servers, virtual machines, Kubernetes pods, and their connectivity graph.

Table 1 below represents an example set of telemetry data that analysis device 50 may receive:

TABLE 1

| result | table | _start | _stop | _time | _value | _field | _measure-ment | header |
|---|---|---|---|---|---|---|---|---|
| _result | 0 | 2022-08-30T13:56:44.802+0000 | 2022-08-30T16:56:44.802+0000 | 2022-08-30T13:57:06.506+0000 | {'size': '4096', 'used': '0', 'available': '4096'} | frag_direct_mempool | dpdk_mempool_stats | ('hostname', b'cto-cn2-07.englab.example.com') |
| _result | 0 | 2022-08-30T13:56:44.802+0000 | 2022-08-30T16:56:44.802+0000 | 2022-08-30T13:57:33.547+0000 | {'size'': '4096'', 'used': '0', 'available': '4096'} | frag_direct_mempool | dpdk_mempool_stats | ('hostname', b'cto-cn2-07.englab.example.com') |
| _result | 0 | 2022-08-30T13:56:44.802+0000 | 2022-08-30T16:56:44.802+0000 | 2022-08-30T13:58:00.669+0000 | {'size': '4096'', 'used': '0', 'available': '4096'} | frag_direct_mempool | dpdk_mempool_stats | ('hostname', b'cto-cn2-07.englab.example.com') |
| _result | 0 | 2022-08-30T13:56:44.802+0000 | 2022-08-30T16:56:44.802+0000 | 2022-08-30T13:58:25.606+0000 | {'size': '4096', 'used': '0', 'available': '4096'} | frag_direct_mempool | dpdk_mempool_stats | ('hostname', b'cto-cn2-07.englab.example.com') |
| _result | 0 | 2022-08-30T13:56:44.802+0000 | 2022-08-30T16:56:44.802+0000 | 2022-08-30T13:58:52.502+0000 | {'size': '4096', 'used': '0', 'available': '4096'} | frag_direct_mempool | dpdk_mempool_stats | ('hostname', b'cto-cn2-07.englab.example.com') |

Table 2 below represents an example set of output data that may be provided to AI anomaly detection engine 54 from telemetry interface 52 based on the input data of Table 1:

TABLE 2

| tenancy | _time | _measure-ment | hostname | field | value | feature_name |
|---|---|---|---|---|---|---|
| dummy | 2022-09-02T21:14:20.0000+000 | dpdk_mempool_stats | cto-cn2-08.englab.example.com | slave_port1_pool | 48.87804878 | used_in_percent |
| dummy | 2022-09-02T21:14:40.000+0000 | dpdk_mempool_stats | cto-cn2-08.englab.example.com | slave_port1_pool | 48.87804878 | used_in_percent |
| dummy | 2022-09-02T21:15:00.000+0000 | dpdk_mempool_stats | cto-cn2-08.englab.example.com | slave_port1_pool | 48.87804878 | used_in_percent |
| dummy | 2022-09-02T21:15:20.000+0000 | dpdk_mempool_stats | cto-cn2-08.englab.example.com | slave_port1_pool | 48.87804878 | used_in_percent |
| dummy | 2022-09-02T21:15:40.000+0000 | dpdk_mempool_stats | cto-cn2-08.englab.example.com | slave_port1_pool | 48.87804878 | used_in_percent |

Table 3 below represents an example set of data that AI anomaly detection engine 54 may generate. The last column of Table 3 represents whether the entry is an anomaly, e.g., 0 for not an anomaly and 1 for an anomaly.

TABLE 3

| tenancy | _time | _measure-ment | hostname | field | value | feature name | anomaly |
|---|---|---|---|---|---|---|---|
| dummy | 2022-09-02T21:14:20.000+0000 | dpdk_mempool_stats | cto-cn2-08.englab.example.com | slave_port1_pool | 48.87804878 | used_in_percent | 0 |
| dummy | 2022-09-02T21:14:40.000+0000 | dpdk_mempool_stats | cto-cn2-08.englab.example.com | slave_port1_pool | 48.87804878 | used_in_percent | 0 |

TABLE 3-continued

| tenancy | _time | _measure-ment | hostname | field | value | feature name | anomaly |
|---|---|---|---|---|---|---|---|
| dummy | 2022-09-02T21:15:00.000+0000 | dpdk_mempool_stats | cto-cn2-08.englab.example.com | slave_port1_pool | 48.87804878 | used_in_percent | 1 |
| dummy | 2022-09-02T21:15:20.000+0000 | dpdk_mempool_stats | cto-cn2-08.englab.example.com | slave_port1_pool | 48.87804878 | used_in_percent | 0 |
| dummy | 2022-09-02T21:15:40.000+0000 | dpdk_mempool_stats | cto-cn2-08.englab.example.com | slave_port1_pool | 48.87804878 | used_in_percent | 0 |

As shown in the example of Table 3, the third entry is an anomaly. AI root cause analysis engine 60 may determine a root cause for this anomaly. Table 4 below represents an example RCA metadata table that AI root cause analysis engine 60 may generate based on the anomaly data of Table 3:

TABLE 4

| tenancy | rca_timestamp_in_utc | rca_method | rca_parameters | rca_direct_output | causality_map | column_name |
|---|---|---|---|---|---|---|
| dummy | 2022-09-15T16:46:49.883+0000 | conditional_granger_causality | {"alpha":"0.05", "icregmode":"LWR", "momax":"10", "seed":"0", "morder":"BIC", "acmaxlags":"1000", "regmode":"LWR", "tstat":"", "mhtc":"FDR"} | {'F': "[[nan, 5.00333349e−04, 7.50483590e−04, 5.34909797e−04, ...]" ... 'sig': "[ 0., 0., 0., 0., 0., 0., 0., 1., nan]]")} | [[0,0,0,0,0,0,1,0,0], [0,0,0,0,0,0,0,0,0], [0,0,0,0,0,0,0,0,0], [0,0,0,0,0,0,0,0,0], [0,0,0,0,0,0,0,0,0], [0,0,0,0,0,0,0,0,0], [0,0,0,0,0,0,0,0,0], [0,0,0,0,0,0,0,0,0], [0,0,0,0,0,0,0,0,0]] | ["cto-cn2-05.englab.example.com_vif_stats_vif0/0_rx_packets_bytes", "cto-cn2-06.englab.example.com_dropstats_overall_counter", ...,"cto-cn2-08.englab.example.com_vif_stats_vif0/0_rx_packets_bytes"] |

Table 5 below represents an example set of data indicating root cause nodes that AI root cause analysis engine 60 may generate based on the anomaly data of Table 3.

TABLE 5

| tenancy | rca_timestamp_in_utc | rca_time_window_start | rca_time window_end | host | measure-ment | field | feature_name |
|---|---|---|---|---|---|---|---|
| dummy | 2022-09-15T16:46:49.883+0000 | 2022-09-04T18:08:20.000+0000 | 2022-09-05T01:48:20.000+0000 | cto-cn2-06.englab.example.com | vif_stats | vif0/0 | rx_packets_bytes |

Figure 4:
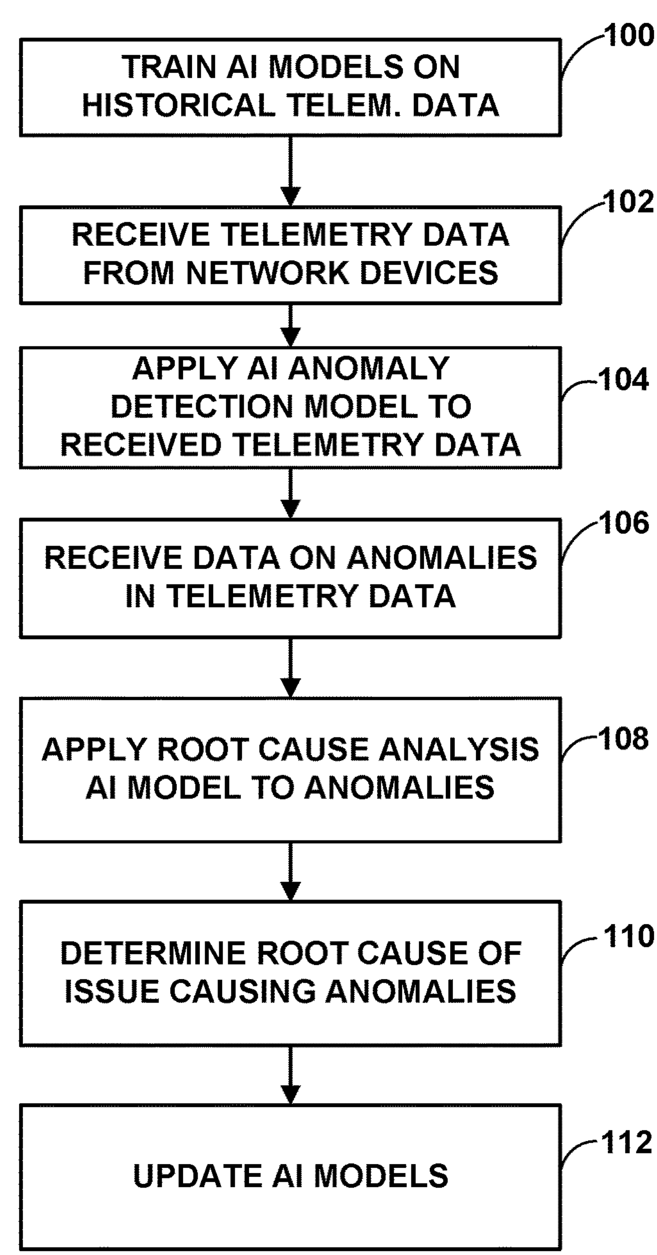
FIG. 4 is a flowchart illustrating an example method of performing root cause analysis according to techniques of this disclosure.

FIG. 4 is a flowchart illustrating an example method of performing root cause analysis according to techniques of this disclosure. The method of FIG. 4 is explained with respect to analysis device 50 for purposes of example. However, other devices may be configured to perform this or a similar method.

Initially, analysis device 50 may train artificial intelligence (AI) models, such as an anomaly detection model and a root cause analysis model, for anomaly detection and root cause analysis on historical telemetry data to detect anomalies and root cause in the historical telemetry data (100). The AI models may be multivariate AI models. Controller device 10 may configure elements 14 to send telemetry data to analysis device 50. Thus, analysis device 50 may receive telemetry data from a plurality of network devices, e.g., elements 14 (102). Controller device 10 may determine which of one or more APIs of elements 14 are to be used to send telemetry data to analysis device 50. Likewise, controller device 10 may, additionally or alternatively, determine one or more KPIs for which to send telemetry data to analysis device 50. In some examples, additionally or alternatively, analysis device 50 may determine the APIs and/or the KPIs.

Analysis device 50 may apply the AI anomaly detection model to the received telemetry data (104). Analysis device 50 may receive, as output of application of the AI anomaly detection model, data representing one or more anomalies in the received telemetry data (106). Analysis device 50 may then apply the root cause analysis AI model to perform a root cause analysis on the anomalies (108). The root cause analysis may be, for example, performed using multivariate conditional Granger causality. The root cause analysis may indicate a root cause of the issue causing the anomalies (110). A user, such as a system administrator, may then address the root cause, e.g., by repairing or replacing a malfunctioning device, updating or reconfiguring a device, or the like. Analysis device 50 may further update the AI models using the received telemetry data (112).

In this manner, the method of FIG. 4 represents an example of a method of performing root cause analysis for a plurality of network devices including receiving telemetry data from the plurality of network devices; applying an artificial intelligence (AI) anomaly detection model, trained on historical telemetry data to detect anomalies in the historical telemetry data, to the received telemetry data to detect one or more anomalies in the received telemetry data; and apply an AI root cause analysis model, trained on historical data, to the anomalies in order to determine a root cause of an issue causing the one or more anomalies.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of performing root cause analysis for a plurality of network devices, the method comprising:
- receiving telemetry data from the plurality of network devices, the received telemetry data including application programming interface (API) data for a plurality of APIs of the plurality of network devices and key performance indicator (KPI) data for a plurality of KPIs for a network including the plurality of network devices;
- applying a multivariate artificial intelligence (AI) anomaly detection model to a target timeseries of the received telemetry data, trained on historical telemetry data to detect anomalies in the historical telemetry data, wherein the multivariate AI anomaly detection model is trained to determine a subset of the plurality of APIs, excluding one or more APIs of the plurality of APIs, to be evaluated within the target timeseries of the received telemetry data, and a subset of the plurality of KPIs, excluding one or more of the KPIs, to be evaluated within the target timeseries of the received telemetry data, to detect one or more anomalies in the target timeseries of the received telemetry data; and
- applying an AI root cause analysis model, trained on historical data, to the anomalies to determine a root cause of an issue causing the one or more anomalies.

2. The method of claim 1, further comprising, prior to receiving the telemetry data, training the AI anomaly detection model and the AI root cause analysis model on the historical telemetry data.

3. The method of claim 1, wherein the AI models comprise multivariate AI models.

4. The method of claim 1, further comprising updating the AI models using the received telemetry data.

5. The method of claim 1, wherein the plurality of network devices include one or more control nodes and one or more compute nodes.

6. The method of claim 1, wherein the received telemetry data is for a multivariate timeseries.

7. The method of claim 1, wherein performing the root cause analysis comprises performing the root cause analysis using causal AI algorithms.

8. The method of claim 1, further comprising generating, based on the determined root cause, a prioritized list of the subset of the plurality of KPIs as contributing to the issue causing the one or more anomalies.

9. The method of claim 8, further comprising generating, based on the determined root cause, a playbook of instructions to address the prioritized list of the subset of the plurality of KPIs to resolve the issue causing the one or more anomalies.

10. The method of claim 1, wherein applying the multivariate AI anomaly detection model comprises:
- for each KPI of the subset of the plurality of KPIs:
  - selecting an AI anomaly detection model from a plurality of available AI anomaly detection models, wherein each of the plurality of available AI anomaly detection models corresponds to one KPI of the plurality of KPIs, and wherein selecting the AI anomaly detection model comprises selecting the AI anomaly detection model corresponding to the KPI; and
  - applying the selected AI anomaly detection model to the target timeseries of the received telemetry data corresponding to the KPI.

11. The method of claim 1, wherein the received telemetry data includes metric data including one or more of gauges, histograms, or counters including data representing one or more of packets, drops, non-uniform memory access (NUMA) hits, or context switches.

12. A system for performing root cause analysis for a plurality of network devices, the system comprising a processing system including one or more processors implemented in circuitry, the processing system being configured to:

receive telemetry data from the plurality of network devices, the received telemetry data including application programming interface (API) data for a plurality of APIs of the plurality of network devices and key performance indicator (KPI) data for a plurality of KPIs for a network including the plurality of network devices;

apply a multivariate artificial intelligence (AI) anomaly detection model to a target timeseries of the received telemetry data, trained on historical telemetry data to detect anomalies in the historical telemetry data, wherein the multivariate AI anomaly detection model is trained to determine a subset of the plurality of APIs, excluding one or more APIs of the plurality of APIs, to be evaluated within the target timeseries of the received telemetry data, and a subset of the plurality of KPIs, excluding one or more of the KPIs, to be evaluated within the target timeseries of the received telemetry data, to detect one or more anomalies in the target timeseries of the received telemetry data; and apply an AI root cause analysis model, trained on historical data, to the anomalies to determine a root cause of an issue causing the one or more anomalies.

13. The system of claim 12, wherein the one or more processors are further configured to, prior to receiving the telemetry data, train the AI anomaly detection model and the AI root cause analysis model on the historical telemetry data.

14. The system of claim 12, wherein the AI model comprises a multivariate AI model.

15. The system of claim 12, wherein the one or more processors are further configured to update the AI models using the received telemetry data.

16. The system of claim 12, wherein the plurality of network devices include one or more control nodes and one or more compute nodes.

17. The system of claim 12, wherein the received telemetry data is for a multivariate timeseries.

18. The system of claim 12, wherein to perform the root cause analysis, the one or more processors are configured to perform the root cause analysis using causal AI algorithm.

19. A computer-readable storage medium having stored thereon instructions that, when executed, cause a processor to:

receive telemetry data from the plurality of network devices, the received telemetry data including application programming interface (API) data for a plurality of APIs of the plurality of network devices and key performance indicator (KPI) data for a plurality of KPIs for a network including the plurality of network devices;

apply a multivariate artificial intelligence (AI) anomaly detection model to a target timeseries of the received telemetry data, trained on historical telemetry data to detect anomalies in the historical telemetry data, wherein the multivariate AI anomaly detection model is trained to determine a subset of the plurality of APIs, excluding one or more APIs of the plurality of APIs, to be evaluated within the target timeseries of the received telemetry data, and a subset of the plurality of KPIs, excluding one or more of the KPIs, to be evaluated within the target timeseries of the received telemetry data, to detect one or more anomalies in the target timeseries of the received telemetry data; and apply an AI root cause analysis model, trained on historical data, to the anomalies in order to determine a root cause of an issue causing the one or more anomalies.

20. The computer-readable storage medium of claim 19, further comprising instructions that cause the processor to update the AI model using the received telemetry data.

* * * * *